(12) United States Patent
Bounon

(10) Patent No.: US 12,471,514 B2
(45) Date of Patent: Nov. 18, 2025

(54) UNIVERSAL INTER-ROW HOE

(71) Applicant: KVERNELAND GROUP LES LANDES-GENUSSON, Les Landes-Genusson (FR)

(72) Inventor: Mathias Bounon, Vermenton (FR)

(73) Assignee: KVERNELAND GROUP LES LANDES-GENUSSON, Les Landes-Genusson (FR)

( * ) Notice: Subject to any disclaimer, the term of this patent is extended or adjusted under 35 U.S.C. 154(b) by 476 days.

(21) Appl. No.: 18/181,996

(22) Filed: Mar. 10, 2023

(65) Prior Publication Data

US 2023/0329134 A1 Oct. 19, 2023

(30) Foreign Application Priority Data

Mar. 10, 2022 (FR) ...................................... 2202112

(51) Int. Cl.
*A01B 63/10* (2006.01)
*A01B 59/00* (2006.01)

(52) U.S. Cl.
CPC .............. *A01B 63/10* (2013.01); *A01B 59/00* (2013.01)

(58) Field of Classification Search
CPC ......... A01B 13/02; A01B 63/10; A01B 59/00; A01B 63/32; A01B 63/22; A01B 63/008; A01B 63/28; A01B 63/118; A01B 63/004; B60D 2001/008

See application file for complete search history.

(56) References Cited

U.S. PATENT DOCUMENTS

| | | | | |
|---|---|---|---|---|
| 10,492,360 B2* | 12/2019 | Connell | ................. | A01B 49/06 |
| 10,506,756 B2* | 12/2019 | Fanshier | ................ | A01B 63/22 |
| 11,429,114 B2* | 8/2022 | Davis | .................. | G05D 1/0278 |
| 2006/0131040 A1* | 6/2006 | Barber | .................. | A01B 63/11 |
| | | | | 172/200 |
| 2019/0327879 A1* | 10/2019 | Fanshier | ................ | A01B 63/22 |
| 2020/0232488 A1* | 7/2020 | Hijikata | .................. | F15B 11/17 |

FOREIGN PATENT DOCUMENTS

| | | | | |
|---|---|---|---|---|
| GB | 2021918 A | * | 12/1979 | ........... A01B 63/102 |
| WO | WO-2005084413 A1 | * | 9/2005 | ............. A01B 63/10 |

OTHER PUBLICATIONS

Preliminary Search Report and Written Opinion issued on Nov. 7, 2022, in corresponding French Application No. 2202112, 6 pages.

* cited by examiner

*Primary Examiner* — Christopher J Sebesta
*Assistant Examiner* — Blake E Scoville
(74) *Attorney, Agent, or Firm* — Maier & Maier, PLLC

(57) ABSTRACT

A universal inter-row hoe arranged to be trailed to a tractor and including at least:
 a guide interface trailed to the tractor,
 a frame secured to said guide interface, and
 a plurality of lifting members each being removably fastened on said frame, and allowing lifting a plurality of tool carriers thanks to an actuator hydraulically connected to a hydraulic block.
The universal inter-row hoe includes a hydraulic distribution circuit.

5 Claims, 5 Drawing Sheets

UNIVERSAL INTER-ROW HOE

TECHNICAL FIELD

The present invention relates to the general field of agriculture, and more particularly an inter-row hoe trailed to a tractor for mechanical field weeding works.

BACKGROUND

In the agricultural field, mechanical weeding, in particular by hoeing, is a technique that has been very widespread in the past, and which has been restricted to a limited range of specialized cultures or to some culture systems such as, in particular, organic farming, because of the development and progress of chemistry.

Nonetheless, with the widespread reduction of uses of chemical weed killers for technical reasons related to resistance management, or in application of environment protection steps, the mechanical alternative today has an immediate and increasing interest, including in the context of conventional culture systems.

Thus, nowadays, it is known to resort to inter-row hoes tailed to a tractor and provided with a plurality of height-adjustable straight teeth, equipped with blades or crowfoot ploughs, for mechanical field weeding works. This inter-row hoe type enables a quick and accurate weeding between several culture rows.

Moreover, to be able to lift the straight teeth off the soil, for example, to avoid passing again on areas that have already been weeded or during the travel phases of the inter-row hoe on public roads, said teeth are conventionally fastened on a four-bar linkage associated to hydraulic actuators and being removably secured to a frame trailed to a tractor.

This inter-row hoe type is effective for mechanical weeding, yet it does not enable easy adaptation to all of the configurations desired by the different users and defined by a number of inter-rows to be treated simultaneously and a spacing between two adjacent inter-rows of the culture field to be weeded.

SUMMARY

Hence, the present invention aims to provide an alternative to known inter-row hoes, this alternative being solid and long-lasting and could be manufactured on an industrial scale. Moreover, this alternative is universal by being able to be easily implemented so as to address all configurations desired by the user.

Hence, in accordance with the invention, a universal inter-row hoe is provided arranged so as to be trailed to a tractor and including at least:
- a guide interface trailed to the tractor,
- a frame secured to said guide interface,
- a plurality of lifting members each being removably fastened on said frame, and allowing lifting a plurality of tool carriers thanks to an actuator hydraulically connected to a hydraulic block, and
- a hydraulic distribution circuit comprising at least:
- a computer box fastened on the frame and arranged so as to communicate with a geolocation system of the tractor,
- a junction box fastened on the frame and connected to the computer box, said junction box containing an electronic board associated to electrical outputs, and
- a hydraulic spool valve arranged so as to enable, reverse or block the circulation of oil originating from the input and from the return of a hydraulic unit of the tractor, said universal inter-row hoe being remarkable in that the hydraulic distribution circuit includes two hosing sets connected to said hydraulic spool valve, and extending transversely over the entirety of said frame and each being provided with a plurality of quick couplers distributed along each hosing set,
- and in that the hydraulic block of each actuator is hydraulically connected to the two hosing sets through hoses provided with quick couplers complementary to said quick couplers and able to be connected to these, and electrically to one of said electrical outputs.

The universal inter-row hoe further includes electrical connectors disposed proximate to said quick couplers and connected to said electrical outputs and in that the hydraulic block of each actuator is electrically connected to one of the electrical connectors.

Preferably, the hydraulic spool valve is an electrically-controlled tandem-center 4/3 spool valve type one and in that the associated control coils are electrically connected to one of said electrical outputs or to one of the corresponding electrical connectors.

Advantageously, the quick couplers of the hosing sets and the complementary quick couplers of the hydraulic block are of the push-pull type.

According to an advantageous embodiment, one amongst the two hosing sets is provided with male quick couplers and the other hosing set is provided with female quick couplers.

BRIEF DESCRIPTION OF THE FIGURES

Other advantages and features will appear better from the following description of an embodiment of the invention with reference to the appended figure wherein.

DETAILED DESCRIPTION

Figure 1:
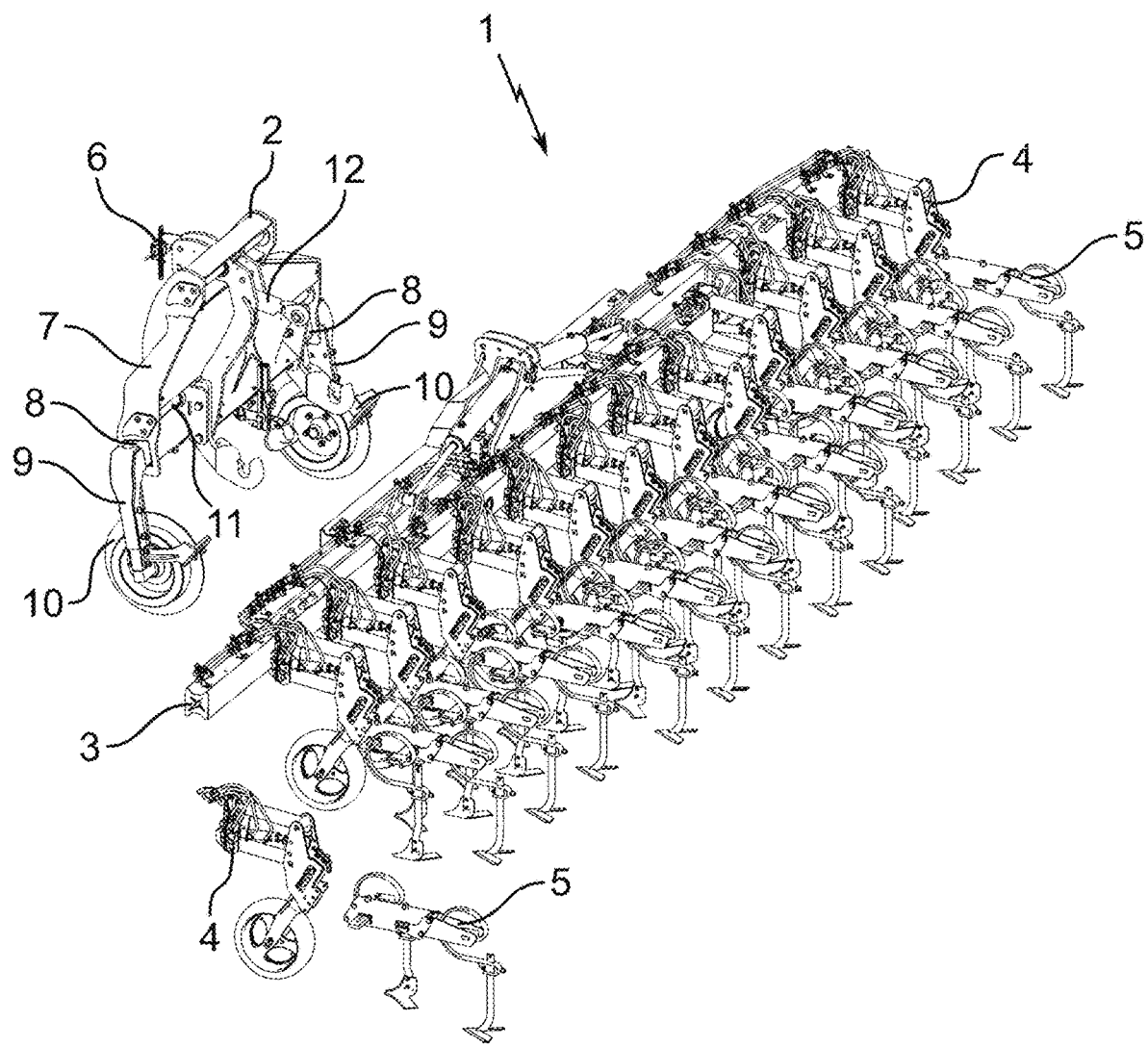
FIG. 1 is a partially exploded rear perspective view of a universal inter-row hoe in accordance with the invention.

Referring to FIG. 1, the universal inter-row hoe 1 according to the invention is intended to be trailed by its front face to an agricultural vehicle, conventionally a tractor, not represented in the figures.

By "front", reference is herein made to any element or portion of an element of the universal inter-row hoe according to the invention disposed on the tractor side and by "rear", reference is made to any element or portion of an element disposed on the side opposite to the tractor.

The universal inter-row hoe 1 according to the invention includes at least:
- a guide interface 2 trailed to the tractor,
- a frame 3 secured to said guide interface 2,
- a plurality of lifting members 4 removably fastened on said frame 3, their number being variable and depending on the number of inter-rows of the cultures to be weeded, a plurality of tool carriers 5 each fastened on one of the lifting members 4.

The guide interface 2 is trailed to the tractor by a first standard three-point linkage 6, preferably of the category II type.

Moreover, the guide interface 2 has a height and a track width that are continuously adjustable. For this purpose, it includes a framework 7 receiving in its front face said first linkage 6 and on its rear face two beams 8 extending horizontally on either side of said framework 7.

Furthermore, each of the beams 8 receives at its free end a foot 9 extending vertically and receiving at its free end a disc wheel 10 with a large diameter ensuring contact of the guide interface 3 with the ground while totally ensuring stability of the latter. Advantageously, each foot 9 is adjustable in height in order to enable an optimum height adjustment of the guide interface 3 according to the culture type (cover crops, root crops or vegetables).

In addition, the framework 7 of the guide interface 2 also includes over its rear face a second standard three-point linkage 12 to enable the attachment of the frame 3 of the universal inter-row hoe 1 according to the invention, this second linkage 12 being preferably of the category II type. Said second linkage 12 is able to translate relative to the latter along their longitudinal axis and perpendicularly to the sagittal plane of the universal inter-row hoe 1 according to the invention Advantageously, the translational movement of said second linkage 12 is ensured by actuators 11 in order to guarantee that the trailed tool follows the culture rows, said actuators 11 being conventionally of the double-acting hydraulic cylinder type.

Finally, according to an advantageous embodiment, the guide interface 2 is associated to a device for self-guidance by a colorimetric camera, enabling a follow-up of the culture rows even in tall vegetation.

Figure 2:
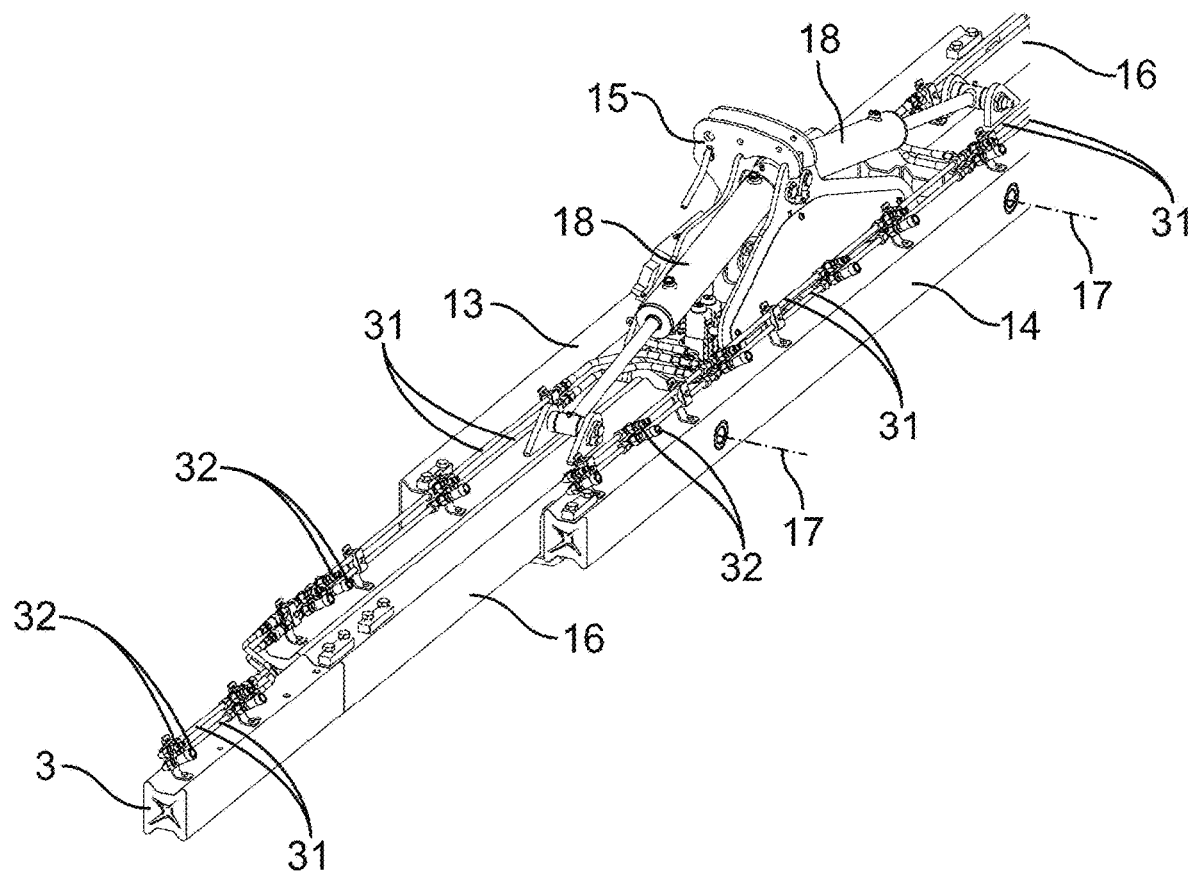
FIG. 2 is a rear perspective view of a portion of the frame of the universal inter-row hoe of FIG. 1.
Figure 3:
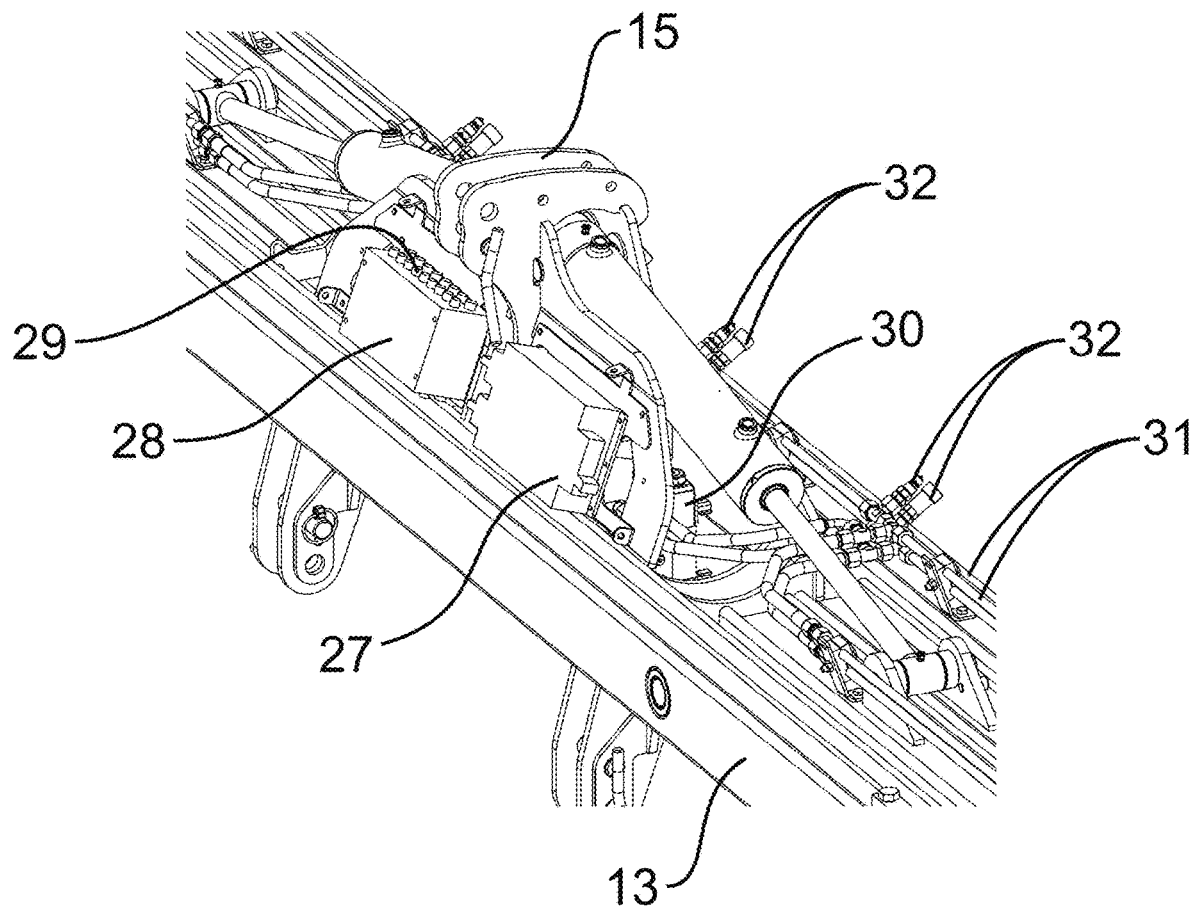
FIG. 3 is a front perspective view of a portion of the frame of FIG. 2.

Referring to FIG. 2, the frame 3 of the universal inter-row hoe 1 according to the invention includes at least:
- two horizontal first beams 13,14 parallel to one another, extending perpendicularly to the sagittal plane of said universal inter-row hoe 1 and held spaced apart from one another by a structure 15 linking the upper face of the middle area of each of the first beams 13,14,
- two second beams 16 each disposed parallel to and partially between the two first beams 13,14, extending on either side of the ends of said two first beams 13,14, and each being pivotally mounted on these two first beams 13,14 by its end located between these about a horizontal axis 17 parallel to the sagittal plane of said universal inter-row hoe 1.

The first beam 13 disposed on the guide interface 2 side, called hereinafter first front beam 13, being secured to the second linkage 12 of the framework 7 of said guide interface 3. The other first beam 14 is then called hereinafter first rear beam 14.

The two second beams 16 are able to pivot between a "work" position in which they are parallel to two front and rear first beams 13,14 and a "transport" position in which they are perpendicular to the two first front and rear beams 13,14. This pivoting of the two second beams 16 is ensured by two actuators 18, conventionally, of the double-acting hydraulic cylinder type each being secured between the structure 15 of the frame 3 of the universal inter-row hoe 1 and one amongst the two second beams 16.

Furthermore, said first front and rear beams 13,14 and second beams 16 advantageously have a cross-section with a H-like general shape.

Advantageously, the frame 3 is width adjustable (5 m, 6 m, 7 m, . . . ) by adding extensions to said second beams 16 and, as described before, foldable to perform movements on public roads.

Moreover, according to an extreme embodiment, the frame 3 of the universal inter-row hoe 1 according to the invention includes only the first front beam 13. This extreme embodiment is economical, yet it turns out to have a limited use with a very reduced number of configurations.

The universal inter-row hoe 1 according to the invention also includes a plurality of lifting members 4 removably fastened on its frame 3 in general, and in particular on the first rear beam 14 and the second beams 16.

However, it should be well understood that having two first front and rear beams 13,14 linked together by a structure 15 allows offering maximum rigidity while enabling a tight attachment of said lifting members 4.

Figure 4:
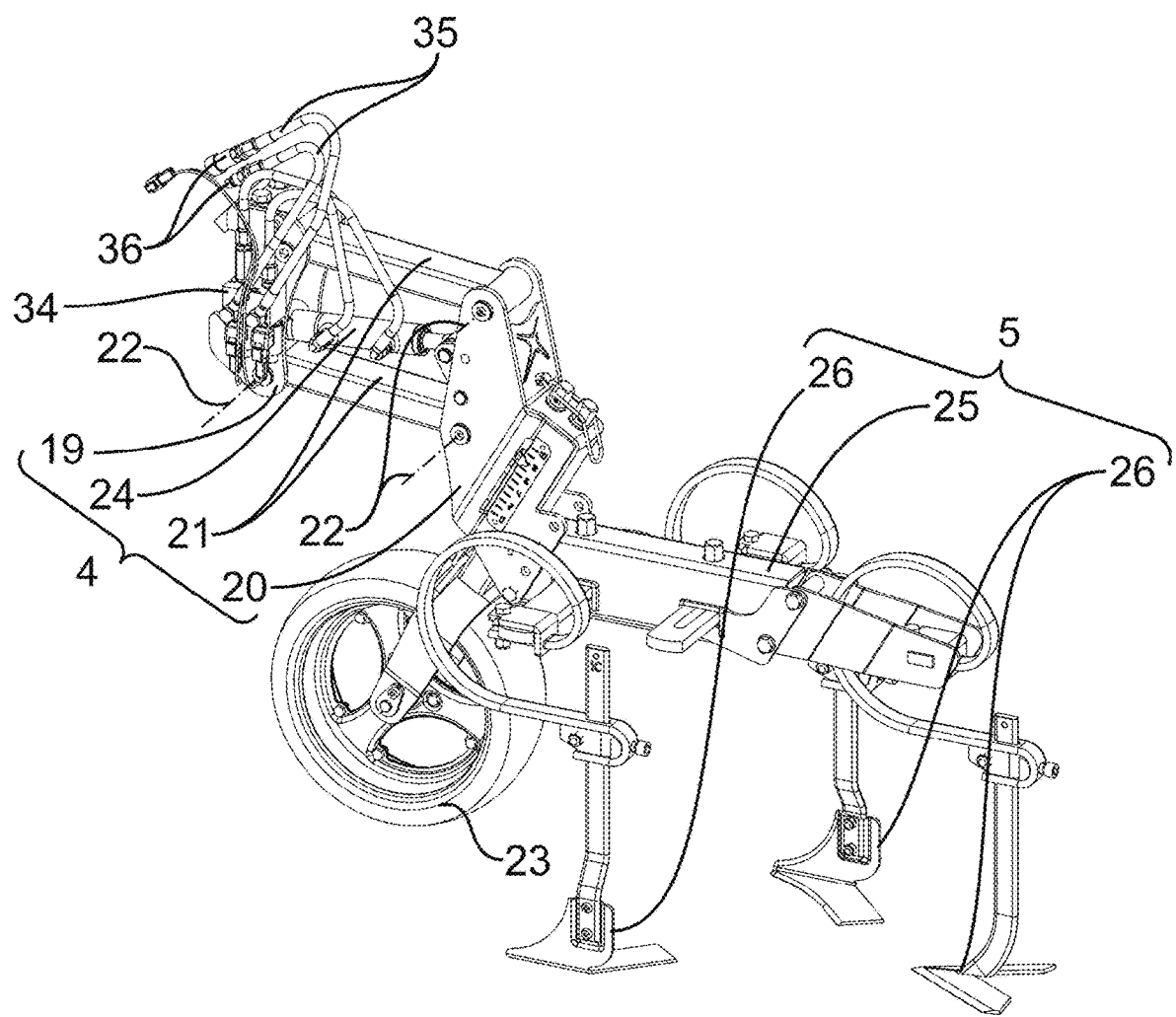
FIG. 4 is a rear perspective view of a four-bar linkage associated to a tool carrier of the universal inter-row hoe of FIG. 1.

Referring to FIG. 4, each of the lifting members 4 includes two front 19 and rear 20 supports parallel to one another and generally vertical and two swing arms 21 parallel to one another, each of the front 19 and rear 20 supports being pivotally mounted at one of the ends of the two swing arms 21 about a horizontal axis 22 perpendicular to the sagittal plane of the universal inter-row hoe 1, the projection of the four axes 22 on said sagittal plane of the universal inter-row hoe 1 forming a four-bar linkage.

The front support 19 of each lifting member 4 is removably fastened on its frame 3 of the universal inter-row hoe 1. Moreover, advantageously, the rear support 20 of each lifting member 4 extends in the direction of the ground beyond the swing arm 20 located the closest to the ground, so as to receive the corresponding tool carrier 5, the latter being advantageously equipped with a backup wheel 23.

To lift or lower the associated tool carrier 5, each lifting member 4 is set in motion by an actuator 24, conventionally, of the double-acting cylinder type, each being secured between the front support 19 and the rear support 20. The actuator 24 allows making the associated lifting member 4 switch from a "high" position in which the tools 26 are off soil and a "low" position in which the tools 26 are in the soil Advantageously, each backup wheel 23 is adjustable in height with respect to the associated lifting member 4 in order to accurately adjust the soil working depth so as to enable soil working.

Each tool carrier 5 includes a generally horizontal bar 25 extending parallel to the sagittal plane of the universal inter-row hoe 1 and being able to carry one or more tool(s) 26 such as for example crowfoot ploughs, "Lelievre" blades, teeth for accurate scalping while barely displacing the soil, vibrating teeth for ridging and covering weeds with half-core, solid-core or ridger ploughs, opener discs, Kress fingers, plant-protection discs, or rear combs.

To set the actuator 24 of each lifting member 4 in motion, the universal inter-row hoe 1 also includes a hydraulic distribution circuit arranged so as to regulate a flow rate of oil continuously supplied by a hydraulic unit of the tractor.

Referring to FIGS. 2 to 5, this hydraulic distribution circuit comprises at least:
- a computer box 27 (ECU: Electronic Control Unit) fastened on the first front beam 13 of the frame 3 of the universal inter-row hoe 1 and arranged so as to communicate with a geolocation system of the tractor through an ISOBUS standard wired connection,
- a junction box 28 fastened on the first front beam 13 of said frame 3 and connected to the computer box 27, said junction box 28 containing an electronic board associated to a plurality (at least eighteen) of low-voltage (namely a voltage comprised between zero and twelve Volts) electrical outputs 29, a hydraulic spool valve 30 arranged so as to enable, reverse or block the circulation of oil originating from the input and from the return of a hydraulic unit of the tractor, two hosing sets 31 connected to said hydraulic spool valve 30, extending over the entirety of said frame 3, i.e. along the first rear beams 14 and the second beams 16, and each being provided with a plurality of quick couplers 32, advantageously of the push-pull type, distributed along each hosing set 31 so as to address all configurations in number and spacing between the lifting members 4, the two hosing sets 31 being respectively connected to the input and to the return of the hydraulic unit of the tractor, and electrical connectors, not represented, disposed proximate to said quick couplers 32 and connected, preferably in a wired manner, to said electrical outputs 29.

To recall, the standard ISOBUS (ISO 11783) allows making communication between a tractor and its trailed tool compatible, even when these are not made by the same manufacturer. It also enables data exchange between the tractor and parcel management software.

In addition, the quick couplers 32 of the two hosing sets 31 are either of the male type or of the female type. According to an advantageous embodiment facilitating the connection of the lifting members 4 and the implementation of the universal inter-row hoe 1, one of the two hosing sets 31 is provided with male quick couplers 32 and the other hosing set 31 is provided with female quick couplers 32.

The computer box 27 is parameterized in factory to address all possible configurations, each configuration depending on the number of lifting members 4, the inter-row distance, the total width of the inter-row hoe 1, i.e. that of its frame 3.

The hydraulic spool valve 30, which is advantageously of the double-acting by-pass type (cf. FIG. 5), prevents the circulation of oil in the two hosing sets 31 when the associated control coils 33 are not excited, these being electrically connected to one of the electrical outputs 29 of the hydraulic distribution circuit, through one of the electrical connectors.

By "double-acting by-pass", reference is herein made to an electrically-controlled tandem-center 4/3 spool valve allowing, in the rest position, blocking the ports connected to the two hosing sets 31 and hydraulically linking the input and return of the hydraulic unit of the tractor.

Moreover, the information of the geolocation system of the tractor indicating the areas of the field to hoe are transmitted from the tractor to the computer box 27 in order to lift, or not, all or part of the tool carriers 5 at determined locations using the associated lifting members 4.

Figure 5:
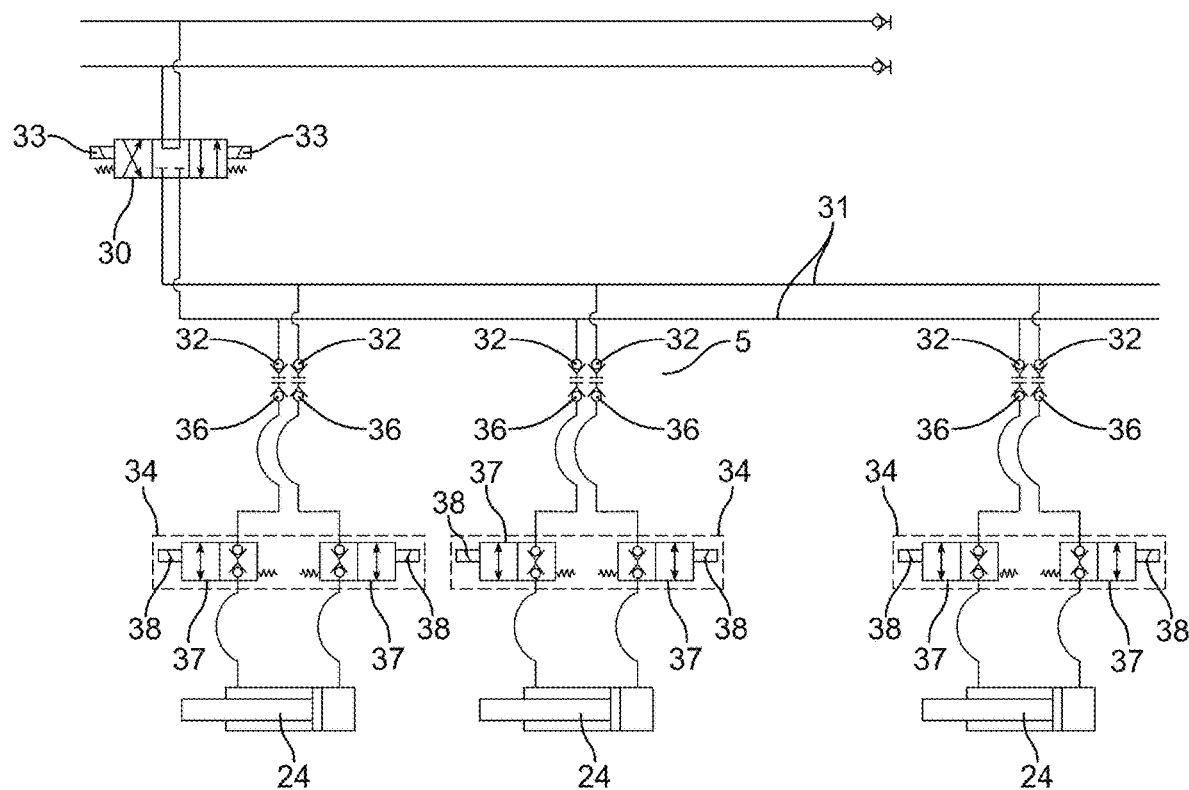
FIG. 5 is a schematic view of a simplified hydraulic circuit of the universal inter-row hoe of FIG. 1.

Moreover, referring to FIGS. 4 and 5, to enable setting of each lifting member 4 in motion, the corresponding actuator 24 is hydraulically connected to a hydraulic block 34 itself hydraulically connected to the two hosing sets 31 through two hoses 35 each provided with quick couplers 36 complementary to the quick couplers 32 of the two hosing sets 31 able to be connected with these. Said hydraulic block 34 includes two valves 37, normally closed at rest, enables the immobilization of the actuator 24 in a given position when the associated coils 38 are not excited. The hydraulic block 34 (more particularly its coils 38) is electrically connected to one of the electrical outputs 29 of the junction box 28 of the hydraulic distribution circuit through one of the electrical connectors.

It should be well understood that a person skilled in the art will have no difficulty to add elements, in particular hydraulic ones, such as filters, flow rate limiter, or blow-off valves to guarantee an optimum operation of the universal inter-row hoe 1 according to the invention.

With this configuration, starting from a configuration in which the tool carriers 5 are in the "high" position, an electrical activation of one of the coils 33 of the hydraulic spool valve 30 of the hydraulic distribution circuit enables the pressurization of one of the hosing sets 31 of the hydraulic distribution circuit, and an electrical activation of the coils 38 of the hydraulic block 34 of one or more lifting member(s) 4 enables the passage of oil in the corresponding actuators 24 so as to make one or more lifting member(s) 4 switch into the "low" position. In this case, the other hosing set 31 of the hydraulic distribution circuit enables the return of oil from the actuators 24 up to the hydraulic unit of the tractor.

Conversely, for the operation of lifting the parallelograms, an electrical activation of the other coil 33 of the hydraulic spool valve 30 of the hydraulic distribution circuit allows obtaining a reversal of the hosing sets 31 of the hydraulic distribution circuit, and an electrical activation of the coils 38 of the hydraulic block 34 of one or more lifting member (s) 4 enables the passage of oil in the corresponding actuators 24 so as to make one or more lifting member(s) 4 switch into the "high" position.

It should be well understood that according to the data from the location system of the tractor, the computer box 27 will determine whether one or more tool carrier(s) 5 should be lifted and will transmit the orders to the junction box 28 so that the latter acts on the coils 33 of the hydraulic spool valve 30 of the hydraulic distribution circuit and the coils 38 of the hydraulic block 34 of the lifting members 4 corresponding to the tool carriers 5 to be lifted.

Moreover, the two actuators 18 ensuring pivoting of the two second beams 16 of the frame 3 are also hydraulically connected to a spool valve, not represented, advantageously similar to the hydraulic spool valve 30 of the hydraulic distribution circuit, this spool valve being, in turn, hydraulically connected to the hydraulic unit of the tractor, and electrically to one of the electrical outputs 29 of the junction box 28 of the hydraulic distribution circuit.

With this configuration of the universal inter-row hoe 1 according to the invention, it should be well understood that the hydraulic distribution circuit is common to all of the lifting members 4 and that the positioning of these is no longer a constraint because all it needs is to couple the complementary quick couplers 36 of said lifting members 4 to the quick couplers 32 of the hosing sets 31 of said hydraulic distribution circuit.

Moreover, the hydraulic distribution circuit of the universal inter-row hoe 1 according to the invention allows integrating in factory the nineteen most common configurations, which allows avoiding the need for making a customized inter-row hoe but rather making a universal inter-row hoe 1 suited to any customer type. In addition, a customer still has the possibility of modulating his universal inter-row hoe 1 at any time and adapting it, for example, to a new seeder.

Furthermore, it should be well understood that this configuration of the universal inter-row hoe 1 according to the invention allows for a significant reduction of equipment and labor costs. Indeed, the used amount of hosing 31 and hoses is limited to the necessary minimum and only one computer box 27 is necessary. In addition, the hydraulic distribution circuit may be pre-mounted as a subassembly which considerably reduces the mounting time and enables carrying out the manufacture and mounting on industrial scale, while limiting and even suppressing any risk of errors.

Finally, the implementation of the universal inter-row hoe 1 according to the invention is easy, the hoses 35 of each lifting member 4 do not remain pressurized, it is therefore easy to couple or uncouple the quick couplers 36 of said lifting members 4 to the quick couplers 32 of the hosing sets 31 of said hydraulic distribution circuit.

It should be well understood that the universal inter-row hoe 1 according to the invention is, of course, used for mechanical field weeding works.

Finally, it goes without saying that the examples of a universal inter-row hoe 1 according to the invention that have just been given are merely non-limiting particular illustrations of the fields of the invention.

The invention claimed is:

1. A universal inter-row hoe arranged so as to be trailed to a tractor, comprising:
   - a guide interface trailed to the tractor,
   - a frame secured to said guide interface,
   - a plurality of lifting members each being removably fastened on said frame, and allowing lifting a plurality of tool carriers thanks to an actuator hydraulically connected to a hydraulic block, and
   - a hydraulic distribution circuit comprising at least:
   - a computer box fastened on the frame and arranged so as to communicate with a geolocation system of the tractor,
   - a junction box fastened on the frame and connected to the computer box, said junction box containing an electronic board associated to electrical outputs, and
   - a hydraulic spool valve arranged so as to enable, reverse or block the circulation of oil originating from an input and a return of a hydraulic unit of the tractor,
   said universal inter-row hoe, wherein the hydraulic distribution circuit includes at least two hosing sets connected to said hydraulic spool valve, and extending over the entirety of said frame and each being provided with a plurality of quick couplers distributed along each hosing set,
   and in that the hydraulic block of each actuator is hydraulically connected to the two hosing sets through hoses provided with quick couplers complementary to said quick couplers of the hosing sets and able to be connected to these, and electrically to one of said electrical outputs.

2. The universal inter-row hoe according to claim 1, further comprising:
   electrical connectors disposed proximate to said quick couplers of the hosing sets and connected to said electrical outputs and in that the hydraulic block of each actuator is electrically connected to one of the electrical connectors.

3. The universal inter-row hoe according to claim 2, wherein the hydraulic spool valve is an electrically-controlled tandem-center 4/3 spool valve type one and in that associated control coils are electrically connected to one of said electrical outputs or to one of the corresponding electrical connectors.

4. The universal inter-row hoe according to claim 1, wherein the quick couplers of the hosing sets and the complementary quick couplers of the hydraulic block are of the push-pull type.

5. The universal inter-row hoe according to claim 1, wherein one amongst the two hosing sets is provided with male quick couplers and the other hosing set is provided with female quick couplers.

* * * * *